United States Patent Office 3,444,220
Patented May 13, 1969

3,444,220
MAGNESIUM SILICATE CATALYZED POLYMERI-
ZATION OF UNSATURATED FATTY ACIDS
Donald H. Wheeler, Minneapolis, Minn., assignor to
General Mills, Inc., a corporation of Delaware
No Drawing. Filed Nov. 23, 1966, Ser. No. 596,433
Int. Cl. C09f 7/06
U.S. Cl. 260—407                                    9 Claims

ABSTRACT OF THE DISCLOSURE

A process of polymerizing unsaturated fatty acids useful for preparing polyamides wherein the catalyst used in the polymerization process is a synthetic magnesium silicate catalyst which has been treated with a nitrogenous compound such as piperidine, pyridine and aniline.

---

This invention relates to the polymerization of unsaturated fatty acids using a synthetic catalyst and in particular a synthetic nitrogenous-base treated, magnesium silicate catalyst. The invention also relates to a novel catalyst useful for polymerizing unsaturated fatty acids, and in particular to a nitrogenous compound treated synthetic magnesium silicate catalyst wherein the nitrogenous compound is pyridine, aniline or piperidine.

Briefly, the process of polymerization consists of heating the unsaturated fatty acids (an individual fatty acid or mixtures thereof, derived from oils or fats) at polymerizing temperatures (preferably in the range of 160 to 280° C.) in the presence of a nitrogenous-base, synthetic magnesium silicate catalyst. Higher temperatures (i.e. about 300° C.) may be employed if desired; however, there is generally no necessity in employing temperatures in excess of about 280° C.

The amount of catalyst employed is not particularly critical, the general range of catalyst from an economic standpoint being from about 5 to about 35% based on the weight of fatty acid feed. About 10-25% is preferred as this appears to provide optimum results. Larger amounts may be employed; however, such amounts may provide operational problems without appearing to provide any proportional benefits. Amounts below 5%, down to as low as 1%, may be employed but are less economical and require extended heating periods.

The time of treatment will, of course, vary with the temperature used and the amount of catalyst employed; however, geenrally the time of treatment will vary from as low as about 1 hour to as high as about 8 hours. Preferably, about 4-6 hours are employed.

The polymerization may be conducted at atmospheric pressure or at elevated (above atmospheric) pressures. When elevated pressures are employed, the pressure is generally that generated by the presence of volatiles in the reaction mixture. If such volatiles naturally present are insufficient to provide the pressure desired, water may be added to the reaction system. In general the pressures generated will be on the order of 25 to in excess of about 250 p.s.i.g. Particularly at the low polymerizing temperatures and at low catalyst concentrations, pressures as low as about 5 p.s.i.g. may be employed. When water is added to develop the desired pressure, it is generally not necessary to exceed 5% by weight based on the fatty acid feed employed. Under atmospheric pressure operation the reaction is conducted in the substantial absence of water unless some means is taken to retain the water and other volatiles.

After the polymerization step, the product is cooled to about 150° C. and then filtered to separate the clay catalyst. Prior to filtration, the product may be given various optional treatments in order to improve the color of the product. One of these treatments is the addition of small amounts of phosphoric acid to the warm reaction product prior to filtration. The phosphoric acid will also serve to decompose any soaps present. Decolorizing carbons and filter aids may also be added to assist in decolorizing and in filtration of the product.

After filtration, the filter cake is washed with a solvent to extract any fatty acid reaction products. The solvent is then removed by evaporation or distillation. Such solvents as hexane, heptane, or any of the lower boiling hydrocarbon solvents, may be used as extracting solvents; or the filter cake may be extracted with hot unpolymerized fatty acids such as those which are obtained as a byproduct from the polymerized fatty acids.

After filtration, the reaction product is stripped of any solvent which may have been used in the filtration process and is then distilled or stripped at low pressures on the order of 0.1 to 3 mm. The monomeric fatty acids are removed at temperatures in the range of up to 250–260° C. at 0.1 to 0.3 mm., leaving a residue of polymerized fatty acids consisting mainly of dimerized fatty acids and higher polymers plus small amounts of monomeric unpolymerized acids. The composition will vary, depending upon the polymerization conditions, temperatures and pressures, and temperatures used for distilling the reaction product. Normally, the compositions as determined by careful distillation at low pressures, will be about 5 to 10% monomeric fatty acids, 65 to 80% dimeric acids and 15 to 25% higher polymers. The monomer acids recovered in the distillation of the reaction product may be used for extracting the filter cakes obtained in subsequent polymerizations, thereby eliminating the use of hydrocarbon solvents which would require a separate and additional solvent recovery step.

The amounts of monomer (M), dimer (D) and trimer and residual higher polymeric forms (T) are determined by a micromolecular distillation method described in J.A.O.C.S., Paschke, R. F., Kerns, J. R., and Wheeler, D. H., vol. 31, pages 5 7 (1954), using a micromolecular still with a quartz helix.

Any unsaturated higher fatty acid generally having from 8 to 22 carbon atoms may be employed in the present process. Illustrative of the ethylenically unsaturated acids are the branched, or straight chain, poly- or mono-ethylenically unsaturated acids such as 3-octenoic acid, 10-undecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linoleni acid, eleostearic acid, hiragonic acid, moroctic acid, timnodonic acid, eicosatetraenoic acid, nisinic acid, scoliodonic acid and chaulmoogric acid.

The acetylenically unsaturated fatty acids may also be employed. Such acids, however, occur only rarely in nature and are expensive to synthesize. Accordingly, such are not currently of commercial significance. Illustrative straight or branched chain, mono- or poly-unsaturated acids of this type are 10-undecenoic acid, tartaric acid, stearolic acid, behenolic acid and isamic acid.

Because of their ready availability and relative ease of polymerization, oleic and linoleic acids are the preferred starting materials for preparation of the polymeric fat acids. Of course, mixtures of fatty acids rich in unsaturated acids may be used. These mixtures of acids may be derived from any common raw material ordinarily used as sources for unsaturated material. Soybean oil, linseed oil, cottonseed oil, safflower oil and fish oils are typical examples of such sources. Tall oil fatty acids may also be employed. Saturated material normally occurs associated with the unsaturated material. The saturated acids do not polymerize in the process described. However, separation of the saturated and unsaturated acids before polymerization is not necessary to the practice of the present invention and the polymerization may be carried out in the presence of the unreacted saturated acid. After polymerization, the unreacted material may, if desired, be removed and the product worked up in any conventional manner.

The catalyst composition is a synthetic nitrogenous-base, magnesium silicate. By "synthetic" is meant "non-naturally occurring" and it is understood thereby that "naturally occurring" materials are excluded. It is preferred to form the magnesium silicate and simultaneously treat with the nitrogenous compound by treating or reacting a dispersion of silica and magnesium oxide and nitrogenous compound. While it is not intended that the invention be limited thereby, it is believed that the nitrogenous compound stabilizes the magnesium silicate composition either by its mere presence therewith or by actual reaction therewith. The stabilization or treatment is preferably conducted under elevated pressures by preferably heating the catalyst ingredients in water under pressures of from about 100–500 p.s.i. at temperatures of about 200–260° C. for a period of from 2 to 6 hours. Higher pressures may be employed; however, as a practical matter they are unnecessary and resort thereto is made only occasionally. In general, time periods of 4–6 hours are preferred. While higher and lower temperatures may be employed, lower temperatures will require longer time periods while higher temperatures do not appear necessary.

As indicated, the synthetic magnesium silicate catalyst is one treated with a nitrogenous compound. Nitrogenous compounds found suitable for the present invention are illustrated by pyridine, aniline and piperidine.

The invention may perhaps best be illustrated by means of the examples below. In the examples, commercially available tall oil fatty acids (Hercules, Pamak I) were employed as the feed material for polymerization, which have the following typical analysis:

| | |
|---|---|
| Acid Value (A.V.) | 192–192.7 |
| Saponification Value (S.V.) | 196–197.5 |
| Iodine Value (I.V.) | 132.8–134 |
| Non-conjugated Linoleic _____percent__ | 35.5 |
| Conjugated Linoleic _____do____ | 6.7–7.1 |
| Saturated Acids _____do____ | 1.7–3.5 |
| Rosin Acids _____do____ | 1.2–1.5 |
| Unsaponifiables _____do____ | 1.6–2.1 |

The typical procedure used in the polymerization of the fatty acids is as follows:

Polymerization procedure

Into a reaction flask equipped with a stirrer and a short air cooled condenser (for atmospheric runs) or an autoclave (pressure runs) are placed the fatty acids and the synthetic catalyst. The mixture is heated, with stirring, under a vacuum and the system flushed twice with nitrogen. Upon reaching the desired temperature, the reaction is maintained at this temperature for the predetermined length of time indicated. The reaction is then cooled to about 160° C. at which time phosphoric acid may be added. After cooling and extraction with a paraffinic hydrocarbon solvent (Skellysolve B), the product is heated on a steam cone and filtered through an activated clay. It is then washed with acid (HCl:H$_2$O:2:1) followed by rinsing with distilled water to remove acid. The water is removed with Na$_2$SO$_4$, and the paraffinic hydrocarbon solvent removed by use of a flash evaporator under vacuum. The residue is distilled up to about 260° C. under vacuum. This residue, free of most of the unpolymerized monomer, is then analyzed for monomer (M), dimer (D) and trimer (T) by the micromolecular distillation method described earlier.

The following examples will illustrate specific embodiments of the invention. Examples A and B are inserted for comparison and illustrate catalysts which have not been treated with a nitrogenous compound. The nitrogenous compound employed and the amounts thereof can be seen from the table of results hereinbelow. In the examples employing the nitrogenous compounds, these were added at the time the magnesium silicate was slurried in water in the procedure described hereinbelow for preparation of the catalysts employed.

Preparation of catalyst

Reactants.—The following amounts were used in each preparation which illustrates the preferred ratio of SiO$_2$ to MgO:

| | | |
|---|---|---|
| SiO$_2$ (as Na$_2$SiO$_3$) | _____moles__ | 1.33 (280 g.) |
| MgO | _____do____ | 1.0 (40 g.) |

Procedure.—To a container containing 1200 ml. of water were added with stirring the Na$_2$SiO$_3$ and the MgO. After thoroughly mixing, the pH of the mixture was adjusted to 9 by adding HCl. The precipitate that resulted was collected by filtration and washed until free of chloride. The precipitate was then slurried in 1200 ml. of water, the nitrogen compound added, and placed in an autoclave equipped with a stirrer and thermometer. The mixture was heated at 200° C. under 200 p.s.i. pressure for 4 hours. The product upon cooling was adjusted to a pH of 6 with HCl and then dried in Pyrex trays overnight in forced-draft oven at 100–105° C.

Preparation of the polymeric fat acids

Into a reaction flask equipped with a stirrer, a short air cooled reflux condenser (for atmospheric runs) or an autoclave (pressure runs) were placed the 100 grams of tall oil fatty acids (Pamak) and 15 grams catalyst (15% by weight based on the amount of fatty acids). The mixture was heated, with stirring, under a vacuum and the system was flushed twice with nitrogen. Upon reaching the desired temperature, the reaction was maintained at this temperature for the predetermined length of time (see Table 1 for specific temperatures and reaction times). The reaction product was cooled to about 160° C. at which time phosphoric acid was added. The product was then cooled and extracted with a paraffinic hydrocarbon solvent (Skellysolve B). The product was then heated on a steam cone and filtered through a filter aid (Super-Cel). It was then washed with acid (HCl:H$_2$O:2:1) and rinsed with distilled water to remove the acid. The water was removed with Na$_2$SO$_4$ and the paraffinic hydrocarbon solvent was removed by use of a flush evaporator under vacuum. The residue was then distilled up to about 260° C. under vacuum. This residue, free of most of the unpolymerized monomer, was analyzed for monomer, dimer and trimer by micromolecular distillation and the yield of D+T can be seen in Table 1.

TABLE 1

| Example No. | Nitrogenous compound | Moles per mole MgO | Reaction time (hrs.) | Reaction temp., °C. | Reaction pressure p.s.i.g. | Sap. value | Acid value | Percent yield D+T | D/T ratio |
|---|---|---|---|---|---|---|---|---|---|
| A | | 0 | 4 | 215 | ¹0 | 191 | 168 | 41.8 | 3.0 |
| B | | 0 | 5 | 260 | 34–146 | 192 | 169 | 42.2 | 2.6 |
| 1 | Pyridine | 0.04 | 4 | 215 | ¹0 | 192 | 175 | 55.2 | 2.6 |
| 2 | do | 0.04 | 5 | 260 | 30–80 | 190 | 178 | 60.0 | 2.9 |
| 3 | do | 0.02 | 4 | 215 | ¹0 | 201 | 179 | 44.6 | 2.3 |
| 4 | do | 0.02 | 5 | 260 | 52–116 | 193 | 176 | 46.9 | 2.4 |
| 5 | do | 0.08 | 4 | 215 | ¹0 | 193 | 168 | 45.7 | 2.6 |
| 6 | do | 0.08 | 5 | 260 | 62–104 | 193 | 173 | 46.9 | 2.6 |
| 7 | do | 0.04 | 4 | 215 | ¹0 | 188 | 170 | 48.5 | 2.3 |
| 8 | do | 0.04 | 5 | 260 | 42–116 | 182 | 166 | 53.5 | 2.4 |
| 9 | do | 0.03 | 4 | 215 | ¹0 | 193 | 170 | 45.4 | 2.6 |
| 10 | do | 0.03 | 5 | 260 | 52–118 | 184 | 171 | 43.6 | 2.1 |
| 11 | do | 0.06 | 4 | 215 | ¹0 | 196 | 160 | 42.9 | 2.2 |
| 12 | do | 0.06 | 5 | 260 | 52–120 | 195 | 170 | 47.0 | 2.5 |
| 13 | do | 0.04 | 4 | 215 | ¹0 | 187 | 163 | 49.3 | 2.3 |
| 14 | do | 0.04 | 5 | 260 | 62–118 | 158 | 143 | 50.7 | 2.3 |
| 15 | Aniline | 0.04 | 5 | 260 | 82–140 | 190 | 174 | 48.8 | 2.9 |
| 16 | Piperidine | 0.04 | 4 | 215 | ¹0 | 187 | 175 | 46.7 | 2.4 |
| 17 | do | 0.04 | 5 | 260 | 70–112 | 191 | 184 | 50.5 | 2.5 |

¹ Atmosphere.

As can be seen from the foregoing data, a synthetic nitrogenous compound treated magnesium silicate catalyst may be employed for the polymerization of unsaturated fatty acids. Modifying the magnesium silicate with a nitrogenous compound provides a significant increase in yield. This may be seen by comparing the yields provided in Examples A and B (without nitrogenous compound) with the subsequent examples illustrating the present invention.

Based on mole ratios, ratios of nitrogenous compound to Mg of from about 0.01 to abut 0.1 may be emplyed. A more desirable range would appear to be from 0.02 to about 0.8 with about 0.04 appearing to be optimum. Ratios of Si/Mg in excess of 4.0 may be employed although generally it is not necessary to exceed a ratio of 4.0. It is generally desirable to use a ratio of at least 0.7. Preferably a range of Si/Mg of from 1.0 to about 2.0 is employed with the optimum occurring about 1.3.

The embodiments of the invention in which an exclusive property or privilege is claimed are defined as follows:

1. In a process of polymerizing unsaturated higher fatty acids wherein said fatty acids are heated in the presence of a catalyst at polymerizing temperatures for a time sufficient to effect polymerization, the improvement comprising employing a synthetic magnesium silicate catalyst in an amount of 1 to 35% by weight based on said unsaturated fatty acids wherein said magnesium silicate catalyst is prepared by heating to a temperature of 200–260° C. at elevated pressures below 500 p.s.i.g., an aqueous dispersion of said catalyst in the presence of a nitrogeneous compound selected from the group consisting of pyridine, aniline and piperidine wherein the catalyst has a ratio of Si to Mg in the range of from 0.7 to 4.0 and a ratio of nitrogenous compound to Mg of from 0.01 to 0.1.

2. A process as defined in claim 1, in which said polymerizing temperature lies within the range of 160–300° C.

3. A process as defined in claim 1 which is conducted at atmospheric pressure.

4. A process as defined in claim 1 which is conducted at elevated pressures of from 5 to 250 p.s.i.g.

5. A process as defined in claim 1 in which said catalyst has a ratio of Si to Mg of from 1.0 to 2.0 and a ratio of nitrogenous compound to Mg of from 0.02 to 0.08.

6. A process as defined in claim 1 in which said catalyst has a ratio of Si to Mg of about 1.3 and a ratio of nitrogenous compound to Mg of about 0.04.

7. A process as defined in claim 1 wherein said nitrogenous compound is pyridine.

8. A process as defined in claim 1 wherein said nitrogenous compound is aniline.

9. A process as defined in claim 1 wherein said nitrogenous compound is piperidine.

References Cited

UNITED STATES PATENTS 2,955,121  10/1960  Myers et al. _____ 260—407
3,157,681  11/1964  Fischer _____ 260—407

ALEX MAZEL, Primary Examiner.

R. J. GALLAGHER, Assistant Examiner.

U.S. Cl. X.R.

252—428; 260—78